US009379919B2

(12) United States Patent
Lin et al.

(10) Patent No.: US 9,379,919 B2
(45) Date of Patent: Jun. 28, 2016

(54) TRANSMISSION CIRCUIT FOR ETHERNET AND PROTECTION COMPONENT SET THEREOF

(71) Applicant: NLightning Technology Ltd., New Taipei (TW)

(72) Inventors: Kun Tsen Lin, New Taipei (TW); Shih Peng Wu, New Taipei (TW)

(73) Assignee: NLIGHTNING TECHNOLOGY LTD., New Taipei (TW)

( * ) Notice: Subject to any disclaimer, the term of this patent is extended or adjusted under 35 U.S.C. 154(b) by 241 days.

(21) Appl. No.: 14/162,986

(22) Filed: Jan. 24, 2014

(65) Prior Publication Data

US 2014/0211356 A1 Jul. 31, 2014

(30) Foreign Application Priority Data

Jan. 31, 2013 (TW) .............................. 102103698 A
May 28, 2013 (TW) .............................. 102118729 A

(51) Int. Cl.
*H02H 9/00* (2006.01)
*H04L 25/02* (2006.01)

(52) U.S. Cl.
CPC .................................. *H04L 25/0278* (2013.01)

(58) Field of Classification Search
CPC ..... H02H 9/005; H04L 29/00; H04L 25/0278
USPC .......................................................... 361/111
See application file for complete search history.

(56) References Cited

U.S. PATENT DOCUMENTS

| 5,077,543 | A | * | 12/1991 | Carlile .......................... 333/177 |
| 5,623,388 | A | * | 4/1997 | Chaudhry ..................... 361/119 |
| 7,200,176 | B1 |   | 4/2007 | Paulos et al. |
| 7,656,956 | B2 |   | 2/2010 | King |

(Continued)

FOREIGN PATENT DOCUMENTS

| TW | 367131 | † | 8/1999 |
| TW | M333721 | † | 12/2007 |

(Continued)

OTHER PUBLICATIONS

Machine translation of Taiwan Patent Document M441977, published Nov. 21, 2012.*

(Continued)

*Primary Examiner* — Thienvu Tran
*Assistant Examiner* — Kevin J Comber
(74) *Attorney, Agent, or Firm* — McClure, Qualey & Rodack, LLP

(57) ABSTRACT

A transmission circuit including four transmission component sets for Ethernet is provided. Each transmission component set is coupled between an Ethernet connector and an Ethernet chip and has a protection component set. For each transmission component set, a first capacitor is coupled between first and second transmission lines (TLs), and coupled to the Ethernet connector via the first TL and to the Ethernet chip via the second TL; a second capacitor is coupled between third and fourth TLs, and coupled to the Ethernet connector via the third TL and to the Ethernet chip via the fourth TL; first and second inductors are cascaded and coupled between the first and third TLs; a third inductor is coupled between the second and fourth TLs; and a contact between the first and second inductors is coupled to a ground via a fifth TL.

10 Claims, 4 Drawing Sheets

(56) References Cited

U.S. PATENT DOCUMENTS

| | | |
|---|---|---|
| 7,761,719 B2 | 7/2010 | Ghoshal et al. |
| 7,964,993 B2 | 6/2011 | Cai et al. |
| 8,132,027 B2 | 3/2012 | Blaha et al. |
| 2007/0189495 A1 | 8/2007 | Crawley et al. |
| 2008/0267212 A1 | 10/2008 | Crawley et al. |
| 2009/0207538 A1 | 8/2009 | Crawley et al. |
| 2013/0265118 A1 | 10/2013 | Liu et al. |

FOREIGN PATENT DOCUMENTS

| | | | |
|---|---|---|---|
| TW | M436860 | † | 9/2012 |
| TW | M439205 | | 10/2012 |
| TW | M440606 | | 11/2012 |
| TW | M441977 | | 11/2012 |
| TW | M449299 | | 3/2013 |
| TW | M468833 | | 3/2013 |
| TW | M451582 | | 4/2013 |
| TW | M463930 | | 10/2013 |
| TW | M463947 | | 10/2013 |
| TW | M466365 | | 11/2013 |
| TW | M466433 | | 11/2013 |
| TW | M468848 | | 12/2013 |
| TW | M468849 | | 12/2013 |
| TW | M468880 | | 12/2013 |

OTHER PUBLICATIONS

English translation of abstract of TW M436860 (published Sep. 1, 2012).
English translation of abstract of TW M439205 (published Oct. 11, 2012).
English translation of abstract of TW M440606 (published Nov. 1, 2012).
English translation of abstract of TW M441977 (published Nov. 21, 2012).
English translation of abstract of TW M449299 (published Mar. 21, 2013).
English translation of abstract of TW M451582 (published Apr. 21, 2013).
English translation of abstract of TW M463930 (published Oct. 21, 2013).
English translation of abstract of TW M463947 (published Oct. 21, 2013).
English translation of abstract of TW M466365 (published Nov. 21, 2013).
English translation of abstract of TW M466433 (published Nov. 21, 2013).
English translation of abstract of TW M468833 (published Mar. 4, 2013).
English translation of abstract of TW M468848 (published Dec. 21, 2013).
Office Action issued in corresponding Taiwan application on Aug. 12, 2015 (and its English translation).
English translation of abstract of TW M468849 (published Dec. 21, 2013).
English translation of abstract of TW M468880 (published Dec. 21, 2013).

\* cited by examiner
† cited by third party

TRANSMISSION CIRCUIT FOR ETHERNET AND PROTECTION COMPONENT SET THEREOF

This application claims the benefit of priority based on Taiwan Patent Application Nos. 102103698 filed on Jan. 31, 2013 and 102118729 filed on May 28, 2013, which are hereby incorporated by reference in their entirety.

CROSS-REFERENCES TO RELATED APPLICATIONS

Not applicable.

BACKGROUND OF THE INVENTION

1. Field of the Invention

The present invention relates to a transmission circuit for Ethernet and a protection component set thereof. More particularly, the transmission circuit of the present invention can replace the transformer of a conventional Ethernet apparatus to provide necessary signal coupling and direct current (DC) isolation in the Ethernet transmission and to provide a surge protection function.

2. Descriptions of the Related Art

As Ethernet devices have become indispensable to the life, people are now highly dependent on the Ethernet devices. However, manufacturing the transformers of the Ethernet devices is a labor intensive work and the Ethernet devices do not have the surge protection function. Therefore, the current Ethernet devices are vulnerable to voltage surges generated by lightening or static electricity in the environment or by voltage surges generated due to switching on and off of the power source.

Accordingly, an urgent need exists in the art to provide a transmission circuit for Ethernet which can be manufactured by automatic production to replace the conventional transformer and to provide the surge protection function.

SUMMARY OF THE INVENTION

An objective of the present invention is to provide a transmission circuit for Ethernet which can be manufactured by automatic production to replace the conventional transformer.

To achieve the aforesaid objective, a transmission circuit for Ethernet is disclosed in the present invention. The transmission circuit comprises four transmission component sets. Each of the transmission component sets is coupled between an Ethernet connector and an Ethernet chip. Each of the transmission component sets comprises a first capacitor, a second capacitor, a first inductor, a second inductor, a third inductor, a first transmission line, a second transmission line, a third transmission line, a fourth transmission line and a fifth transmission line. For each of the transmission component sets: the first capacitor is coupled between the first transmission line and the second transmission line, and coupled to the Ethernet connector via the first transmission line and to the Ethernet chip via the second transmission line; the second capacitor is coupled between the third transmission line and the fourth transmission line, and coupled to the Ethernet connector via the third transmission line and to the Ethernet chip via the fourth transmission line; the first inductor and the second inductor are cascaded and coupled between the first transmission line and the third transmission line; the third inductor is coupled between the second transmission line and the fourth transmission line; and a contact between the first inductor and the second inductor is coupled to a ground via the fifth transmission line.

Another objective of the present invention is to provide a protection component set for use in each of the transmission component sets of the aforesaid transmission circuit to provide the surge protection function. To achieve this objective, a protection component set is disclosed in the present invention. The protection component set of each of the transmission component sets is coupled between the second transmission line and the fourth transmission line. The protection component set comprises a first transient suppressing diode, a second transient suppressing diode and a high-speed diode. The first transient suppressing diode is coupled between the second transmission line and the high-speed diode. The second transient suppressing diode is coupled between the fourth transmission line and the high-speed diode. The high-speed diode is coupled to the ground.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The following embodiments are intended to illustrate the technical contents of the present invention but not to limit the scope of the present invention. It shall be appreciated that, in the following embodiments and the attached drawings, elements unrelated to the present invention are omitted from depiction; and dimensional relationships among individual elements in the following attached drawings are illustrated only for ease of understanding, but not to limit the actual scale.

Figure 1:
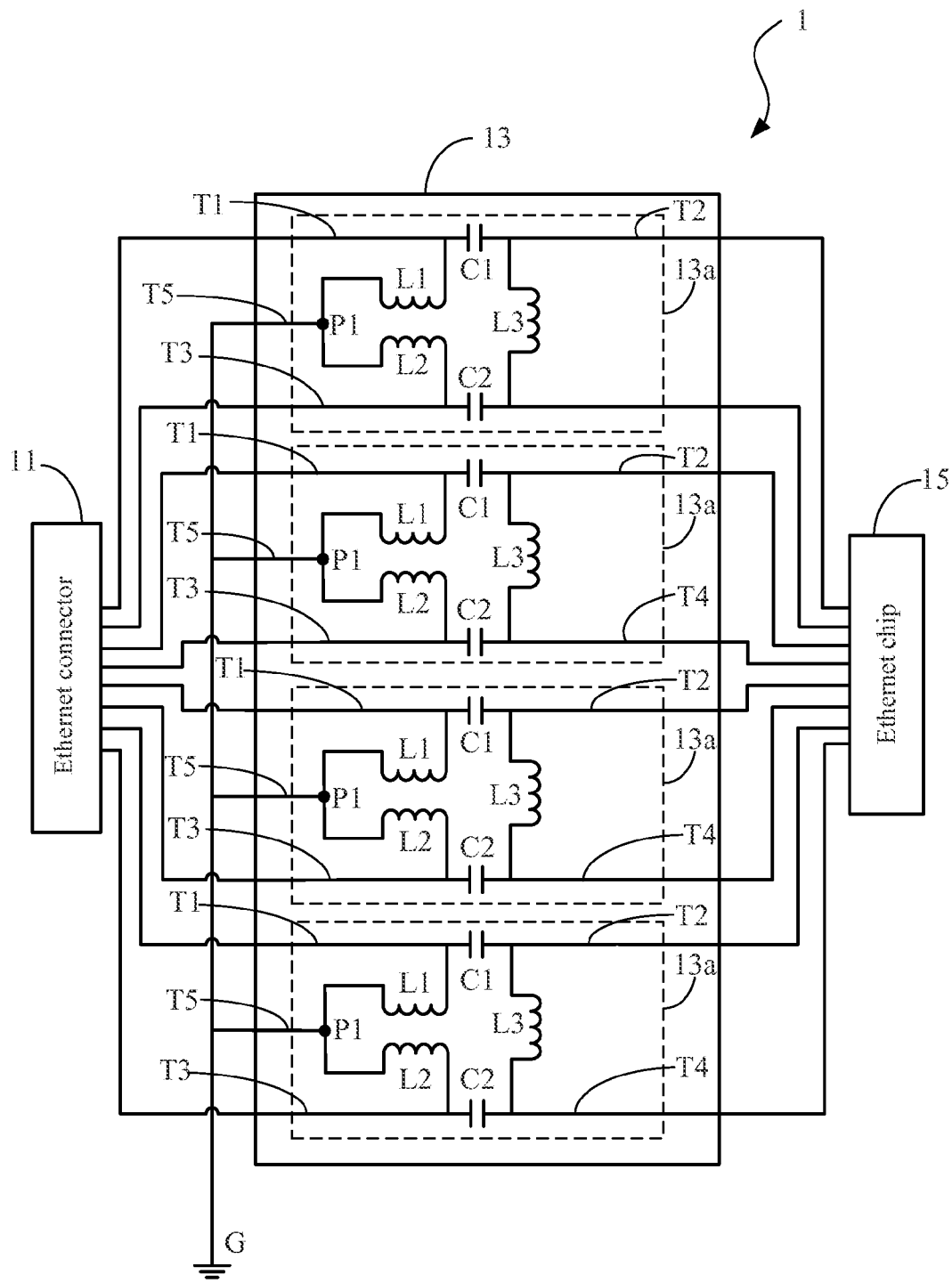
FIG. 1 is a schematic view of an Ethernet application circuit 1 of a first embodiment of the present invention.

A first embodiment of the present invention is as shown in FIG. 1, which is a schematic view of an Ethernet application circuit 1 of the present invention. The Ethernet application circuit 1 comprises an Ethernet connector 11, a transmission circuit 13 and an Ethernet chip 15.

The Ethernet connector 11 may be an Ethernet connector having an RJ-45 interface, which includes a Tx0+ pin, a Tx0− pin, a Tx1+ pin, a Tx1− pin, a Tx2+ pin, a Tx2− pin, a Tx3+ pin, and a Tx3− pin. The Ethernet chip 15 may be a chip from any chip manufacturer, such as: the RTL8201 chip of Realtek Semiconductor Corporation, which includes a MD0+ pin, a MD0− pin, a MD1+ pin, a MD1− pin, a MD2+ pin, a MD2− pin, a MD3+ pin, and a MD3− pin. Because the main technical contents of the present invention focus on the transmission circuit 13, and how the transmission circuit 13 of the present invention replaces the transformer of the conventional Ethernet application circuit and is coupled between the Ethernet connector 11 and the Ethernet chip 15 will be readily appreciated by those of ordinary skill in the art based on the following descriptions, the Ethernet connector 11 and the Ethernet chip 15 will not be further described herein.

The transmission circuit 13 comprises four transmission component sets 13a. Each of the transmission component sets 13a is coupled between the Ethernet connector 11 and the Ethernet chip 15. Each of the transmission component sets 13a comprises a first capacitor C1, a second capacitor C2, a first inductor L1, a second inductor L2, a third inductor L3, a first transmission line T1, a second transmission line T2, a third transmission line T3, a fourth transmission line T4 and a fifth transmission line T5.

For each of the transmission component sets 13a: the first capacitor C1 is coupled between the first transmission line T1 and the second transmission line T2, and coupled to the Ethernet connector 11 via the first transmission line T1 and to the Ethernet chip 15 via the second transmission line T2; the second capacitor C2 is coupled between the third transmission line T3 and the fourth transmission line T4, and coupled to the Ethernet connector 11 via the third transmission line T3 and to the Ethernet chip 15 via the fourth transmission line T4.

For each of the transmission component sets 13a: the first inductor L1 and the second inductor L2 are cascaded and coupled between the first transmission line T1 and the third transmission line T3; the third inductor L3 is coupled between the second transmission line T2 and the fourth transmission line T4; and a contact P1 between the first inductor L1 and the second inductor L2 is coupled to a ground G via the fifth transmission line T5.

In this embodiment, the first capacitor C1 and the second capacitor C2 are each a non-polar capacitor which can provide the effects of signal coupling and DC isolation, and the first capacitor C1 and the second capacitor C2 each have a capacitance ranging between 1 nanofarad (nF) and 10 nF. Furthermore, the first inductor L1 and the second inductor L2 each have an inductance ranging between 3 microhenry ($\mu$H) and 13 $\mu$H, and the third inductor L3 has an inductance ranging between 15 $\mu$H and 30 $\mu$H. The first inductor L1, the second inductor L2 and the third inductor L3 can provide impedance matching at a specific frequency and provide a stable DC level.

The transmission circuit 13 may be implemented by coupling the first capacitor C1, the second capacitor C2, the first inductor L1, the second inductor L2 and the third inductor L3 on a printed circuit board (PCB) in the circuit connection way shown in FIG. 1 and leading out 20 pins from the PCB. Accordingly, the transmission circuit 13 can replace the transformer of the conventional Ethernet application circuit and be coupled between the Ethernet connector 11 and the Ethernet chip 15 to provide necessary signal coupling and DC isolation in the Ethernet transmission.

In addition, the transmission circuit 13 may also be implemented through a process of integrating the capacitors and the inductors into one piece, for example, by adopting the co-fired ceramic technology. Moreover, the transmission circuit 13 may also be implemented by adopting a semiconductor process to form the capacitors and the inductors on a same Si substrate.

Figure 2:
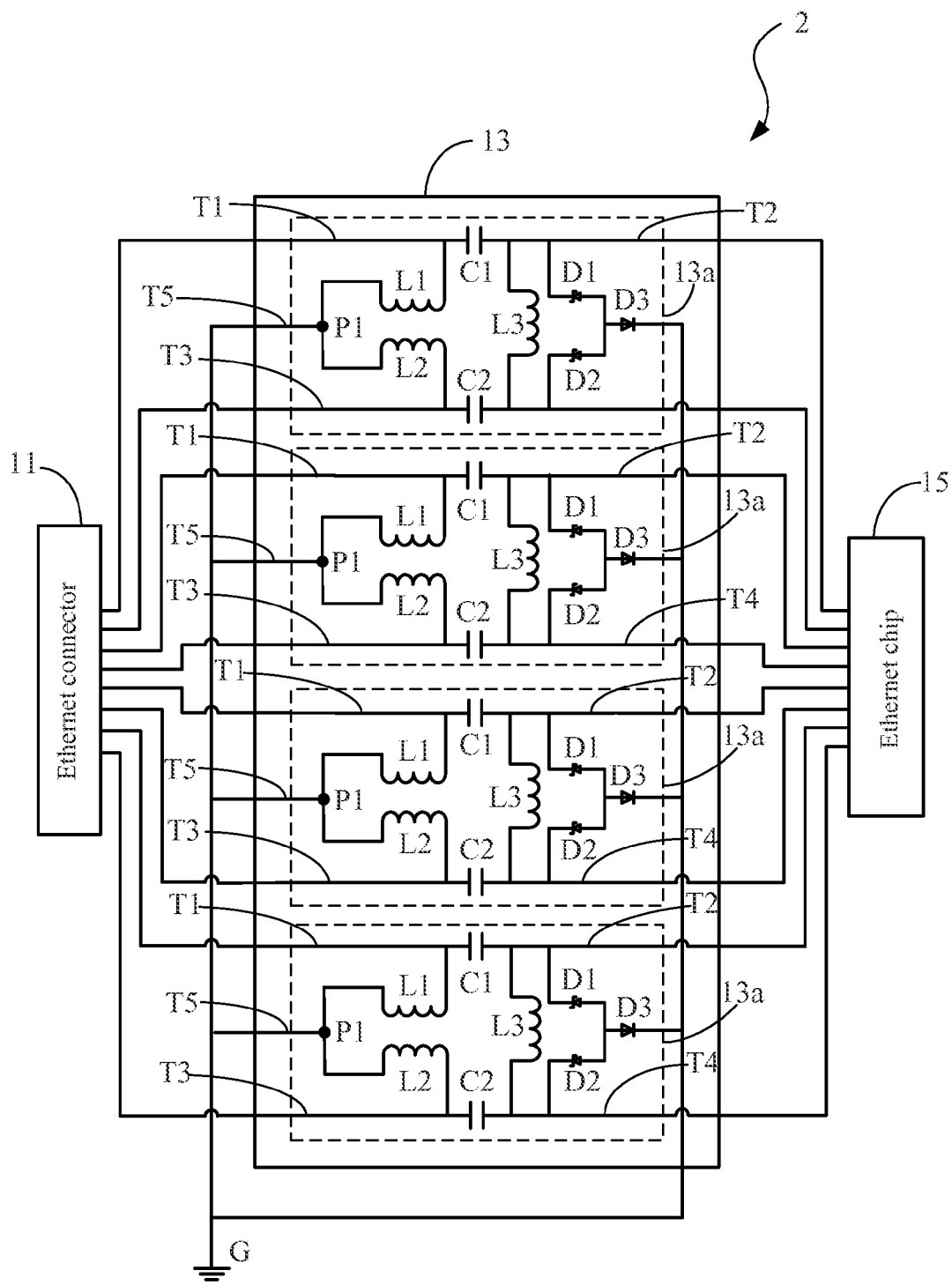
FIG. 2 is a schematic view of an Ethernet application circuit 2 of a second embodiment of the present invention.

A second embodiment of the present invention is as shown in FIG. 2, which is a schematic view of an Ethernet application circuit 2 of the present invention. This embodiment differs from the first embodiment in that, each of the transmission component sets 13a of the transmission circuit 13 further comprises a protection component set which is coupled between the second transmission line T2 and the fourth transmission line T4. The protection component set comprises a first transient suppressing diode D1, a second transient suppressing diode D2 and a first high-speed diode D3. The first transient suppressing diode D1 is coupled between the second transmission line T2 and the first high-speed diode D3. The second transient suppressing diode D2 is coupled between the fourth transmission line T4 and the first high-speed diode D3. The first high-speed diode D3 is coupled to the ground.

When the transmission circuit 13 of this embodiment replaces the transformer of the conventional Ethernet application circuit and is coupled between the Ethernet connector 11 and the Ethernet chip 15, the transmission circuit 13 can not only provide necessary signal coupling and DC isolation in the Ethernet transmission, but further provide the surge protection function.

Figure 3:
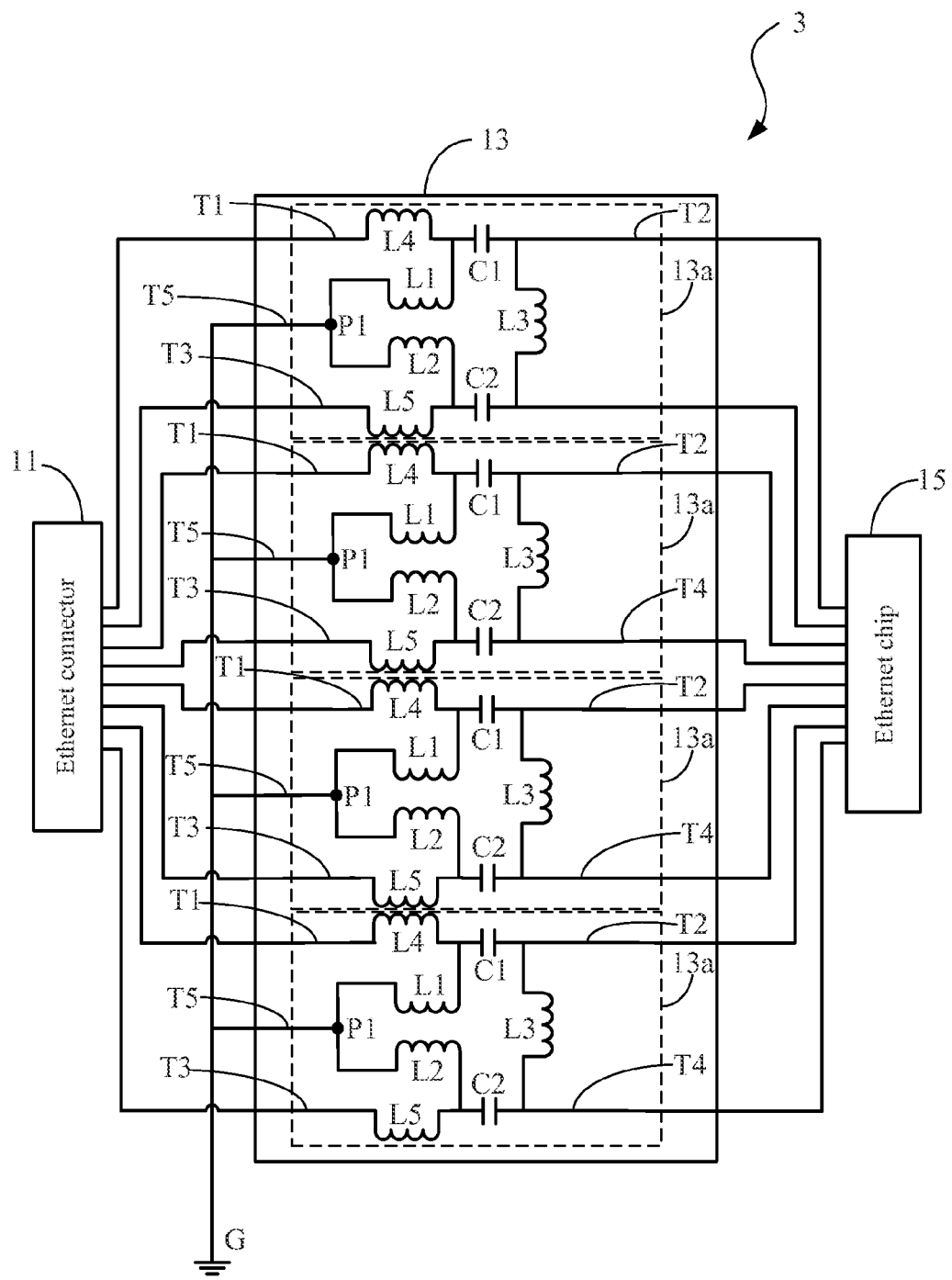
FIG. 3 is a schematic view of an Ethernet application circuit 3 of a third embodiment of the present invention.

A third embodiment of the present invention is shown in FIG. 3, which is a schematic view of an Ethernet application circuit 3 of the present invention. The Ethernet application circuit 3 comprises an Ethernet connector 11, a transmission circuit 13 and an Ethernet chip 15. Compared with the first embodiment, in this embodiment, each of the transmission component sets 13a of the transmission circuit 13 further comprises a fourth inductor L4 and a fifth inductor L5. For each of the transmission component sets 13a: the first capacitor C1 and the first inductor L1 are coupled to the first transmission line T1 via the fourth inductor L4; the second capacitor C2 and the second inductor L2 are coupled to the third transmission line via the fifth inductor L5. This configuration can improve the impedance matching characteristic and reduce the signal response bandwidth so as to suppress the high-frequency noises.

In this embodiment, the first capacitor C1 and the second capacitor C2 are each a non-polar capacitor which can provide the effects of signal coupling and DC isolation, and the first capacitor C1 and the second capacitor C2 each have a capacitance ranging between 5 nF and 35 nF. Furthermore, the first inductor L1, the second inductor L2, the third inductor L3, the fourth inductor L4 and the fifth inductor L5 each have an inductance ranging between 5 $\mu$H and 35 $\mu$H. The first inductor L1, the second inductor L2, the third inductor L3, the fourth inductor L4 and the fifth inductor L5 can provide impedance matching at a specific frequency and provide a stable DC level.

Figure 4:
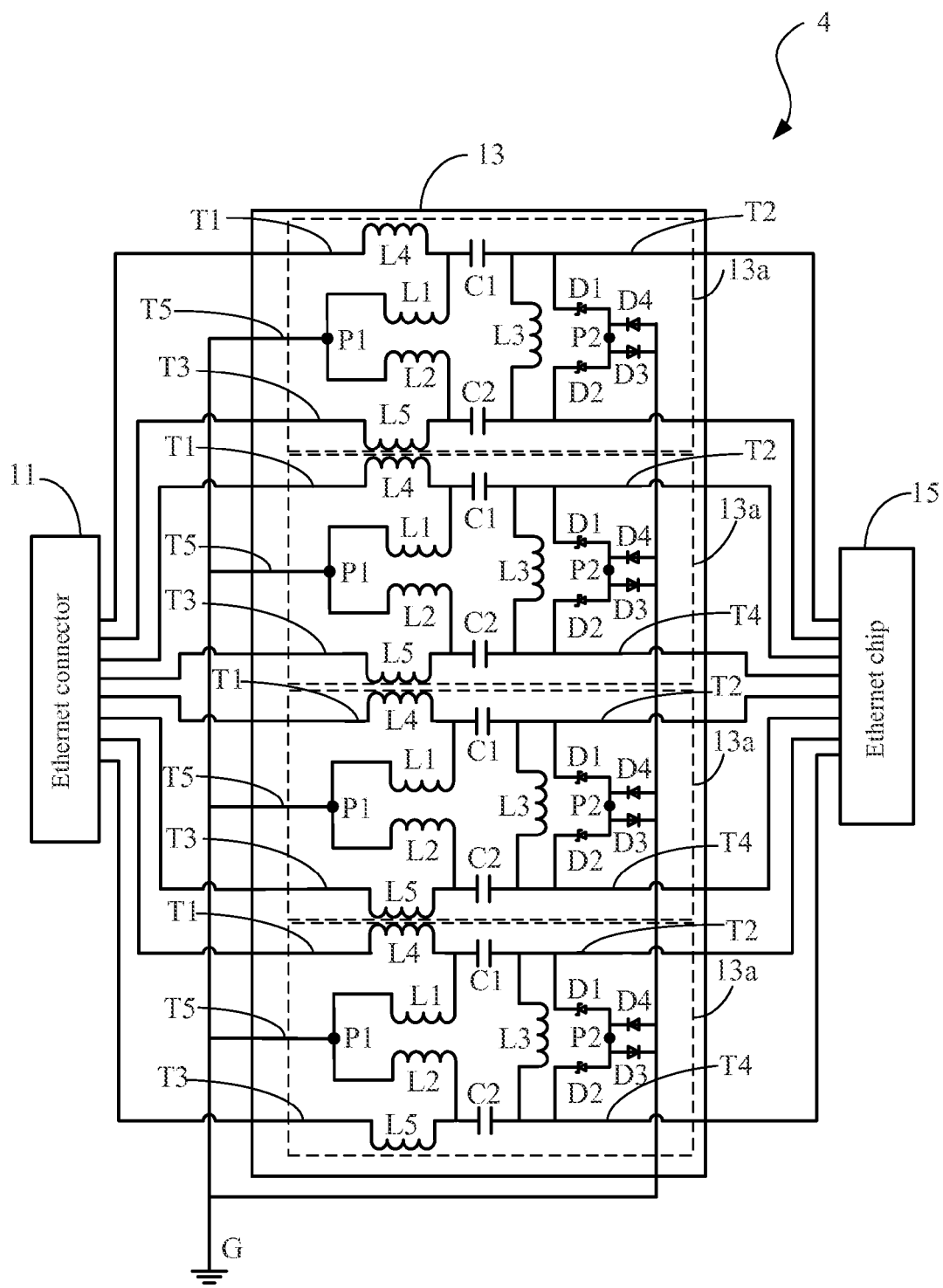
FIG. 4 is a schematic view of an Ethernet application circuit 4 of a fourth embodiment of the present invention.

A fourth embodiment of the present invention is shown in FIG. 4, which is a schematic view of an Ethernet application circuit 4 of the present invention. This embodiment differs from the third embodiment in that, each of the transmission component sets 13a of the transmission circuit 13 further comprises a protection component set which is coupled between the second transmission line T2 and the fourth transmission line T4. The protection component set comprises a first transient suppressing diode D1, a second transient suppressing diode D2, a first high-speed diode D3 and a second high-speed diode D4.

The first transient suppressing diode D1 and the second transient suppressing diode D2 are inversely cascaded and coupled between the second transmission line T2 and the fourth transmission line T4. The first high-speed diode D3 and the second high-speed diode D4 are connected in anti-parallel and coupled between the ground G and a contact P2 between the first transient suppressing diode D1 and the second transient suppressing diode D2. Accordingly, when the transmission circuit 13 of this embodiment replaces the transformer of the conventional Ethernet application circuit and is coupled between the Ethernet connector 11 and the Ethernet chip 15, the transmission circuit 13 can not only provide necessary signal coupling and DC isolation in the Ethernet transmission, but further provide the surge protection function.

According to the above descriptions, as compared with the transformer of the conventional Ethernet devices, the transmission circuit of the present invention can be manufactured by automatic production to reduce the production cost. Furthermore, the transmission circuit of the present invention can provide necessary signal coupling and DC isolation in the Ethernet transmission and provide the surge protection function.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A transmission circuit for Ethernet, comprising:
    four transmission component sets, each of the transmission component sets being electrically coupled between an Ethernet connector and an Ethernet chip;
    wherein:
    each of the transmission component sets comprises a first capacitor, a second capacitor, a first inductor, a second inductor, a third inductor, a first transmission line, a second transmission line, a third transmission line, a fourth transmission line and a fifth transmission line, and for each of the transmission component sets:
    the first capacitor is electrically coupled between the first transmission line and the second transmission line, and electrically coupled to the Ethernet connector via the first transmission line and to the Ethernet chip via the second transmission line;
    the second capacitor is electrically coupled between the third transmission line and the fourth transmission line, and electrically coupled to the Ethernet connector via the third transmission line and to the Ethernet chip via the fourth transmission line;
    the first inductor and the second inductor are cascaded and electrically coupled between the first transmission line and the third transmission line;
    the third inductor is electrically coupled between the second transmission line and the fourth transmission line, wherein the third inductor does not share a common core with either of the first or second inductors; and
    a contact between the first inductor and the second inductor is electrically coupled to a ground via the fifth transmission line.

2. The transmission circuit as claimed in claim 1, wherein each of the transmission component sets further comprises a protection component set coupled between the second transmission line and the fourth transmission line, and the protection component set comprises a first transient suppressing diode, a second transient suppressing diode and a first high-speed diode, the first transient suppressing diode is coupled between the second transmission line and the first high-speed diode, the second transient suppressing diode is coupled between the fourth transmission line and the first high-speed diode, and the first high-speed diode is coupled to the ground.

3. The transmission circuit as claimed in claim 1, wherein the first capacitor and the second capacitor are each a non-polar capacitor.

4. The transmission circuit as claimed in claim 1, wherein the first capacitor and the second capacitor each have a capacitance ranging between 1 nanofarad (nF) and 10 nF.

5. The transmission circuit as claimed in claim 1, wherein the first inductor and the second inductor each have an inductance ranging between 3 microhenry ($\mu$H) and 13 $\mu$H, and the third inductor has an inductance ranging between 15 $\mu$H and 30 $\mu$H.

6. A protection component set for use in each of the transmission component sets of the transmission circuit as claimed in claim 1, being coupled between the second transmission line and the fourth transmission line;
    wherein the protection component set comprises a first transient suppressing diode, a second transient suppressing diode and a high-speed diode, the first transient suppressing diode is coupled between the second transmission line and the high-speed diode, the second transient suppressing diode is coupled between the fourth transmission line and the high-speed diode, and the high-speed diode is coupled to the ground.

7. The transmission circuit as claimed in claim 1, wherein each of the transmission component sets comprises a fourth inductor and a fifth inductor, and for each of the transmission component sets, the first capacitor and the first inductor are coupled to the first transmission line via the fourth inductor, and the second capacitor and the second inductor are coupled to the third transmission line via the fifth inductor.

8. The transmission circuit as claimed in claim 7, wherein the first capacitor and the second capacitor each have a capacitance ranging between 5 nF and 35 nF.

9. The transmission circuit as claimed in claim 7, wherein the first inductor, the second inductor, the third inductor, the fourth inductor and the fifth inductor each have an inductance ranging between 5 $\mu$H and 35 $\mu$H.

10. A protection component set for use in each of the transmission component sets of the transmission circuit as claimed in claim 7, being coupled between the second transmission line and the fourth transmission line;
    wherein the protection component set comprises a first transient suppressing diode, a second transient suppressing diode, a first high-speed diode and a second high-speed diode, the first transient suppressing diode and the second transient suppressing diode are inversely cascaded and coupled between the second transmission line and the fourth transmission line, and the first high-speed diode and the second high-speed diode are connected in anti-parallel and coupled between the ground and a contact between the first transient suppressing diode and the second transient suppressing diode.

* * * * *